United States Patent [19]

Chi et al.

[11] 4,058,586

[45] Nov. 15, 1977

[54] FORMING AND CRYSTALLIZATION PROCESS FOR MOLECULAR SIEVE MANUFACTURE

[75] Inventors: Chang Whan Chi, Columbia; Gordon Herman Hoffman, Baltimore; Emil Eichhorn, Timonium, all of Md.

[73] Assignee: W. R. Grace & Co., New York, N.Y.

[21] Appl. No.: 661,457

[22] Filed: Feb. 25, 1976

[51] Int. Cl.$^2$ ............................................. C01B 33/28
[52] U.S. Cl. ............................. 423/118; 252/455 Z; 423/328
[58] Field of Search .............. 423/118, 328, 329, 330; 252/455 Z

[56] References Cited

U.S. PATENT DOCUMENTS

| | | | |
|---|---|---|---|
| 3,119,659 | 1/1964 | Taggart et al. | 423/118 |
| 3,119,660 | 1/1964 | Howell et al. | 423/118 |
| 3,338,672 | 8/1967 | Haden et al. | 423/118 |
| 3,394,989 | 7/1968 | Drost | 423/329 X |
| 3,433,587 | 3/1969 | Haden et al. | 423/118 |

FOREIGN PATENT DOCUMENTS 1,132,883  11/1968  United Kingdom ................. 423/118

*Primary Examiner*—Edward J. Meros
*Attorney, Agent, or Firm*—William W. McDowell, Jr.; Joseph P. Nigon; Arthur P. Savage

[57] ABSTRACT

A method of preparing zeolitic aluminosilicates particularly those zeolitic aluminosilicates that are characterized by pores in the 4 and 10A sizes that are designated Zeolites A and X by the Linde Division of Union Carbide Corporation in which compacts of the Zeolites A and X, metakaolin, clay mixture undergo crystallization at a temperature of 200° to 700° F. The crystallization is carried out in a calciner or other type of drying equipment. Normally the formed particles furnish all of the liquid needed for crystallization. If desired, however, additional steam may be added during the crystallization process.

8 Claims, No Drawings

FORMING AND CRYSTALLIZATION PROCESS FOR MOLECULAR SIEVE MANUFACTURE

BACKGROUND OF THE INVENTION

This invention relates to a process for preparing synthetic crystalline zeolites having an effective pore sizes of about 4 and 10A in a form which is substantially useful in adsorbtion processes.

Microselective adsorbent of the zeolite type or crystalline aluminosilicates with a three-dimensional struction of silica, alumina, tetrahedral. This zeolite structure is characterized by a repeating three-dimensional network of large open aluminosilicate cages and are connected by small uniform openings and pores. Certain of these microselective adsorbents have been prepared synthetically from sodium silicate and sodium aluminate. After synthesis these large cavities are filled with water which can be driven off by heating without collapsing the cage. When dehydrated these cavities can readsorb large quantities of water or other vapor at low partial pressure. Due to the uniform structures or pore openings connecting the aluminosilicate cavities these zeolites exhibit the unique property of excluding larger molecules from the cavity and allowing small cavities to pass through and be adsorbed. Thereby acting as microselective adsorbents for molecules according their size and shape.

Because the zeolites are recovered from the manufacturing process as fine powders it is necessary to form the zeolites into nodular structures that can be packed into fixed beds for adsorption of gases or liquids from a stream. This is normally done by binding the zeolites with a material such as clay. The disadvantage of such a process however is that the clay is inactive and thus from 15 to 20% of the bed (depending on the percentage of clay used as a binder) is inactive.

U.S. Pat. No. 3,119,659 to Taggert discloses a process for preparing a so-called binderless sieve in which the clay is converted to zeolite by subsequent treatment to convert the clay binder to zeolite. This process involves a crystallization step in which the nodules are heated in a bath of sodium hydroxide solution to convert the clay binder to the zeolite.

BRIEF DESCRIPTION OF THE INVENTION

The process of the instant application prepares a binderless type A molecular sieve by blending a clay with the type A or X zeolites, adding a sufficient quantity of a solution of sodium hydroxide and forming beads. If desired, nucleation centers may be added to the mixture of type A or X zeolite, sodium hydroxide and clay. The mixture is then calcined at a temperature of 200° to 600° F. in a conventional calciner. The product before calcination contains 30 to 45% moisture and the moisture content is reduced from 1 to 5% by drying and calcination.

The process is an improvement over the process of Taggert in that it eliminates the aging step. It dries at a temperature of 200° to 600° F. and converts the clay binder to the zeolite. These temperatures are substantially higher than the crystallization temperatures of Taggert and other processes for preparing binderless molecular sieves. In addition, the crystallization is carried out utilizing the water that is present in the beads as they are formed and does not require that the crystallization be carried out in a sodium hydroxide solution or under pressurized condition.

DETAILED DESCRIPTION OF THE INVENTION

The first step of the process is the mixing of the clay with the type A or X zeolitic aluminosilicates. The clay is present in an amount of from about 10 to 30% with 20% being preferred. The method of preparing the type A or X zeolites is not part of this invention. It is described in several issued patents. Very briefly, the process consists of preparing a solution of sodium aluminate from sodium hydroxide and alumina trihydrate, adding the sodium silicate diluted to the desired concentration and adding nucleation centers, if desired. This mixture is then heated to a temperature of about 100° to 125° C. for a period of time sufficient to complete crystallization. The product is filtered, washed and, exchanged with calcium chloride or other salts if it is desired to convert the zeolite to the calcium or other form. The product is then dried and stored.

In the next step of our process the clay (metakaolin) and type A or X zeolites are blended and a sufficient quantity of sodium hydroxide is added. The sodium hydroxide is added in a concentration of 10 to 25 weight percent is added to blend of zeolite and clay mixture. This sodium hydroxide input is equivalent to about 90 to 120% of the theoretical amount required to convert all the metakaolin clay binder to the zeolite. If desired, nucleation centers may be added to this mixture. The mixture is then formed into nodules of the desired size. This step of the process is conventional and may require granulation and separation of the nodules by size. After the nodules have formed they have a moisture content of about 30 to 40%. This moisture comes from the sodium hydroxide solution added in the forming step. The nodules are then dried in a rotary calciner or other conventional type of calcination equipment at a temperature of 200° to 600° F. and calcined at a temperature of 400° to 1200° F. During this drying the water content is reduced to about 10 to 20% and calcined to about 1 to 5%, preferably about 3%. The final product contains about 95 to 100% type A zeolite or Type X with Type A binder and is a hard nodular product that is suitable for use in adsorbtion processes.

Our invention is illustrated by the following specific but non-limiting examples.

EXAMPLE 1

This example illustrates a plant process for preparing the binderless zeolite nodules of the instant invention.

A charge of 3000 lbs. of Type A zeolite in the sodium form and 600 lbs. of metakaolin were blended in a conventional mixture. A total of 260 lbs. of sodium hydroxide (120% of the theoretical amount required to convert the metakaolin to type A zeolite) was added as a solution diluted to about 17 weight percent sodium hydroxide. This amount was equivalent to 43 lbs. of 100% sodium hydroxide per 100 lb. of metakaolin. The blend was then mixed to a thin paste and about 960 lbs. of blended powder was added to the paste in order to form the mixture into nodules of about 4–8 mesh in size. This addition reduces the amount of caustic to 95% of the theoretical amount required to convert the clay to the zeolite.

The blended nodules were then passed through a granulator and those that passed through about a 10 mesh screen were selected for the next step of the process. In the next step of our process the granulated zeolite was formed into nodules. The nodules were then crystallized by passing them through a rotary calciner at a temperature of 200 to 600° F. No external steam was added during drying. The nodules were in the dryer for a period of 30 to 60 minutes. The product was activated by passing the nodules through a second pass in the calciner operated at a temperature of 400° to 1200° F. with a 30 to 60 minute residence time. The product (8–12 mesh beads) had the following characteristics: Total volatiles (T.V.) as determined by weight loss on heating to 1750° F. 1.63; crush strength in lbs. 9.8; density in lbs. per cubic foot 42; water adsorption at 10% relative humidity 23.17; pH of a 5% slurry 11.37.

EXAMPLE 2

The product was prepared using the same concentration of reactants as in Example 1. In this run the crystallization was carried in a calciner operated at about 300° to 600° F. and retained in the calciner for a period of 30 to 40 minutes. In the previous run the steam generated by the liquid in the nodules was sufficient to complete crystallization of the metakaolin into type A zeolite. The activation of the nodules was accomplished by a second pass through the calciner at a temperature of about 400°–1100° F. with a 30 to 40 minute residence time. The product (8–12 mesh beads) was essentially type A zeolite and had the following characteristics: T.V. 1.55; Average crush strength in lbs. 10.0; density in lbs. per cubic foot 43; water absorption at 10% relative humidity 22.43; pH of a 5% slurry the nodules 11.36.

EXAMPLE 3

In this example the same quantities of reactants were used and the same steps were carried except that the calcination was carried out at a temperature of 300° to 600° F. in a rotary calciner where the nodules were in the calciner for a period of 30 to 40 minutes. As in the previous run the steam generated by evaporation from the nodules was sufficient for crystallization of the metakaolin to the product. The product was activated by a second pass through the calciner operated at a temperature of 400°–1100° F. The nodules were subjected to this temperature for a period of 30 to 40 minutes. The product recovered (8–12 mesh beads) was essentially 100% type A zeolite and had the following characteristics:

| | |
|---|---|
| T.V. | 1.58 |
| Average Crush Strength, lbs. | 9.9 |
| Density, lbs/ft.$^3$ | 42.8 |
| Water Adsorption at 10RH | 23.06 |
| pH of 5% slurry | 11.42 |

What is claimed is:

1. In a process for preparing formed zeolite particles wherein a powdered zeolite is mixed with amounts of metakaolin, sodium hydroxide and water required to produce additional zeolite, and the resulting mixture is formed to obtain reactive zeolite containing particles which are subsequently reacted at elevated temperatures to convert the metakaolin to zeolite, the improvement which comprises:
   a. heating the formed particles which contain about 30 to 45 percent by weight moisture at a temperature of about 200° to 700° F. for a period of 15 to 60 minutes to reduce the moisture content thereof to about 10 to 20 percent by weight and to simultaneously convert said metakaolin to zeolite; and
   b. calcining said particles to a temperature of 400° to 1100° F. for 15 to 60 minutes.

2. The process of claim 1 wherein said calcined particles comprise from about 95 to 100 percent zeolite.

3. The process of claim 1 wherein said powdered zeolite is selected from the group consisting of types A, X, and Y zeolite and mixtures thereof.

4. The process of claim 1 wherein the particles subjected to heating in Step (a) contain from about 10 to 30 percent by weight metakaolin.

5. The process of claim 1 wherein said heating Step (a) is conducted in an atmosphere which contains steam.

6. The process of claim 1 wherein the calcination step is conducted at atmospheric pressure.

7. The process of claim 1 wherein the calcination is carried out in the presence of air.

8. The process of claim 1 wherein the sodium hydroxide contained in the formed particles is present as a 10 to 30 weight percent solution.

* * * * *